US012773935B2

(12) United States Patent
Ferguson

(10) Patent No.: US 12,773,935 B2
(45) Date of Patent: Oct. 27, 2026

(54) MECHANICALLY ACTUATABLE SEAT STRUCTURE WITH DYNAMICALLY CONFIGURABLE SUPPORT SURFACE

(71) Applicant: Gulfstream Aerospace Corporation, Savannah, GA (US)

(72) Inventor: Johnny Ferguson, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 330 days.

(21) Appl. No.: 18/499,868

(22) Filed: Nov. 1, 2023

(65) Prior Publication Data

US 2025/0135974 A1 May 1, 2025

(51) Int. Cl.
*B60N 2/66* (2006.01)

(52) U.S. Cl.
CPC .................................. *B60N 2/6671* (2015.04)

(58) Field of Classification Search
CPC .................................................... B60N 2/6671
See application file for complete search history.

(56) References Cited

U.S. PATENT DOCUMENTS 5,076,643 A * 12/1991 Colasanti ............... A47C 7/467 297/284.6
5,190,348 A * 3/1993 Colasanti ............... A47C 7/467 297/DIG. 8
5,462,335 A * 10/1995 Seyler ....................... B60N 2/66 297/284.4
5,567,011 A * 10/1996 Sessini ............... B60N 2/02246 297/284.7
5,806,927 A * 9/1998 Schneider ............ B60N 2/0228 297/284.6
6,056,360 A * 5/2000 Schneider ............ B60N 2/6673 297/284.4
2009/0102255 A1* 4/2009 D'Agostini .......... B60N 2/6671 297/216.12
2009/0212615 A1* 8/2009 Maierhofer ............ A47C 7/465 297/284.4

* cited by examiner

*Primary Examiner* — David R Dunn
*Assistant Examiner* — Tania Abraham
(74) *Attorney, Agent, or Firm* — Ingrassia Fisher & Lorenz, LLP

(57) ABSTRACT

A mechanically actuatable structural assembly includes first and second elastically deformable panels. Each panel includes a respective: leading edge region; trailing edge region opposing the leading edge region; first side edge region; and second side edge region opposing the first side edge region. The leading edge regions are coupled together to form a joined leading edge, and the trailing edge regions are coupled together to form a joined trailing edge. The side edge regions are not directly attached to each other. The structural assembly also includes means for applying a compressive axial load to the joined leading and trailing edges. The load causes the first and second panels to adaptively buckle into respective loaded shapes. Removal of the load causes the first and second panels to return to their relaxed shapes.

20 Claims, 14 Drawing Sheets

MECHANICALLY ACTUATABLE SEAT STRUCTURE WITH DYNAMICALLY CONFIGURABLE SUPPORT SURFACE

TECHNICAL FIELD

Embodiments of the subject matter described herein relate generally to support structures and assemblies of the type suitable for use with seats and seating systems. More particularly, embodiments of the subject matter relate to an actuatable support structure having at least one dynamically configurable support surface.

BACKGROUND

Adjustable user support structures are commonly used in various applications such as seats and related seating systems, beds, massage and chiropractic tables, and the like. For example, adjustable seats are commonly deployed in different vehicle applications, including aircraft, automobiles, trains, and buses. Vehicle seating systems, for example, can be manually or electronically adjusted to change the angle of recline, to deploy a headrest, to extend an ottoman or leg rest, to change the shape or position of a lumbar support, to change the shape or size of side bolsters, or the like. As another example, most aircraft seats designed for business class or premium class passengers can be manually or electronically adjusted between an upright seating position and a flat (sleeping, berth) position.

Some adjustable seats include inflatable air bladders that can be inflated/deflated in a controlled manner to change the shape or contour of the seating surface. Unfortunately, such air bladders can be prone to leakage, susceptible to puncture, and expensive to manufacture, maintain, and replace. Accordingly, there is a need for a reliable alternative to an air bladder system that can be used in an adjustable support structure such as a vehicle seat. Furthermore, other desirable features and characteristics will become apparent from the subsequent detailed description and the appended claims, taken in conjunction with the accompanying drawings and the foregoing technical field and background.

BRIEF SUMMARY

Embodiments of a mechanically actuatable structural assembly are presented here. In accordance with some embodiments, the structural assembly includes a first panel, a second panel, and an actuation assembly. The first panel includes: a first elastically deformable region formed from elastic material; a first leading edge region; a first trailing edge region opposing the first leading edge region; and a first pair of opposing side edge regions. The first elastically deformable region resides between the first leading edge region and the first trailing edge region. The second panel includes: a second elastically deformable region formed from elastic material; a second leading edge region coupled to the first leading edge region to form a joined leading edge region; a second trailing edge region opposing the second leading edge region and coupled to the first trailing edge region to form a joined trailing edge region; and a second pair of opposing side regions. The second elastically deformable region resides between the second leading edge region and the second trailing edge region. The second pair of opposing side edge regions are free to move relative to the first pair of opposing side edge regions. The actuation assembly includes: a first component configured to engage the joined leading edge region; a second component configured to engage the joined trailing edge region; and a movable loading element coupled to the first component and cooperating with the second component. At least a portion of the movable loading element resides between the first and second panels. When the movable loading element is in an extended state, the first elastically deformable region is unloaded or preloaded to maintain a first relaxed shape, and the second elastically deformable region is unloaded or preloaded to maintain a second relaxed shape. When the movable loading element is in a retracted state, the first elastically deformable region is subjected to compressive axial loading that causes the first elastically deformable region to buckle into a first loaded shape, and the second elastically deformable region is subjected to compressive axial loading that causes the second elastically deformable region to buckle into a second loaded shape.

Also disclosed here is an exemplary embodiment of a mechanically actuatable structural assembly that includes a first elastically deformable panel and a second elastically deformable panel. The first panel includes: a first leading edge region; a first trailing edge region opposing the first leading edge region; a first side edge region; and a second side edge region opposing the first side edge region. The second elastically deformable panel includes: a second leading edge region coupled to the first leading edge region to form a joined leading edge; a second trailing edge region opposing the second leading edge region and coupled to the first trailing edge region to form a joined trailing edge; a third side edge region; and a fourth side edge region opposing the third side edge region. The first side edge region is not directly attached to the third side edge region, and the second side edge region is not directly attached to the fourth side edge region. The structural assembly also includes means for applying a compressive axial load to the joined leading and trailing edges. The compressive axial load causes the first elastically deformable panel to adaptively buckle into a first loaded shape, and causes the second elastically deformable panel to adaptively buckle into a second loaded shape. Removal of the compressive axial load causes the first elastically deformable panel to return to a first relaxed shape, and causes the second elastically deformable panel to return to a second relaxed shape.

Also presented here is a seating system that includes at least one instance of a mechanically actuatable structural assembly of the type summarized above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
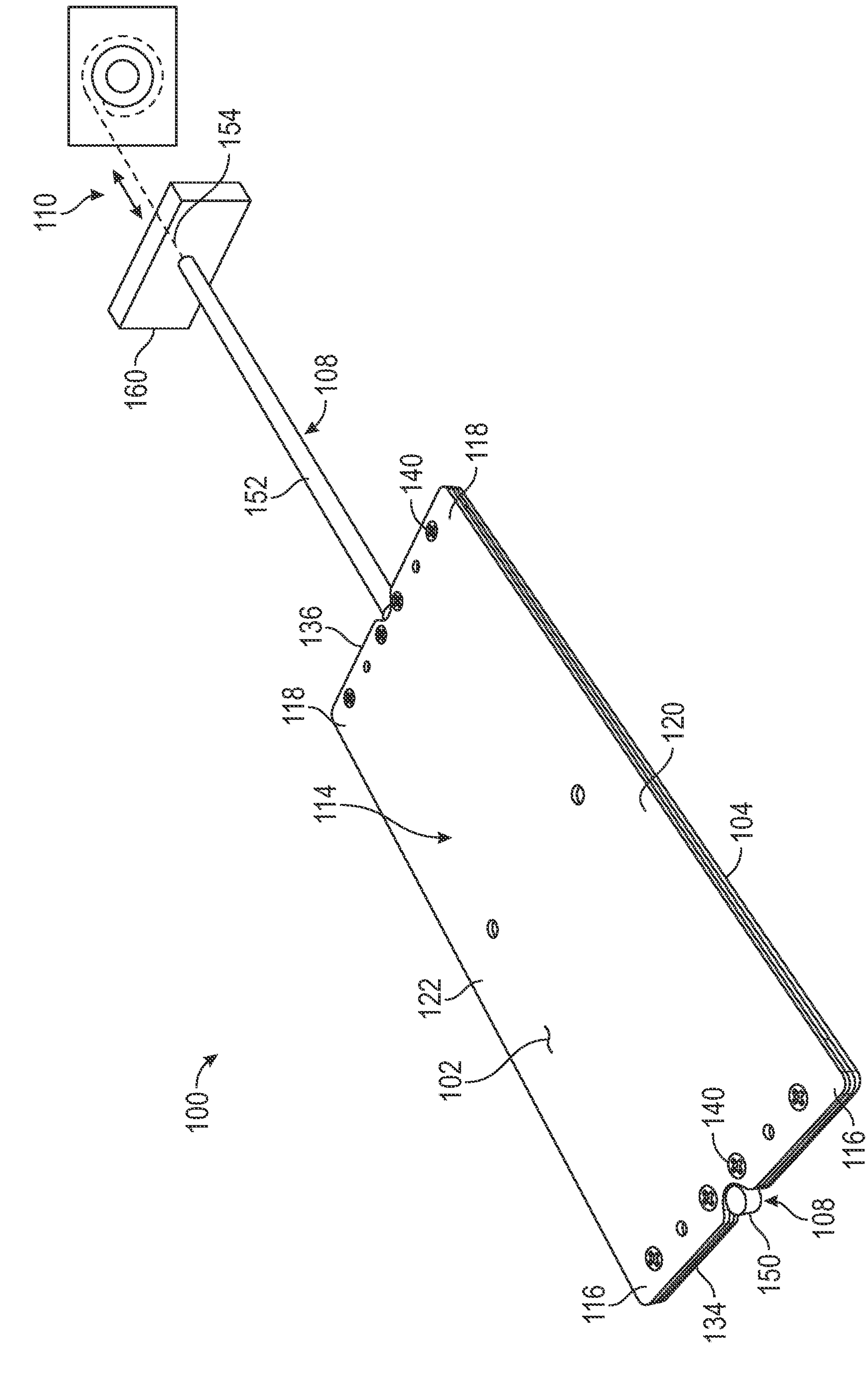
FIG. 1 is a perspective view of an exemplary embodiment of a mechanically actuatable structural assembly, in an unloaded or preloaded state.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In the following description, certain terminology may be used for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Disclosed herein are dynamic morphing (shape-shifting) mechanically actuatable support mechanisms and related physical structures that can be actuated to place them into different load-bearing or user-supporting states, such as a relatively flat shape and a relatively contoured or curved shape. In accordance with certain embodiments, the disclosed mechanisms and support structures can be utilized onboard a vehicle such as an aircraft. For example, the figures depict exemplary embodiments of a mechanically actuatable structural assembly that is suitably configured for use with an aircraft seat. However, it should be appreciated that embodiments of the disclosed subject matter can be utilized for other vehicle applications including, without limitation: trains; helicopters; automobiles; watercraft; monorails; amusement park rides; transportation systems; ski lifts; or the like. Moreover, embodiments of the disclosed subject matter can also be utilized with non-vehicle applications including, without limitation: residential applications; commercial applications; office space applications; recreational equipment; etc. These and other applications, use cases, and platforms are contemplated by this disclosure.

Some conventional aircraft seats use contoured foam to provide comfort for seating during extended flight times; some aircraft seat systems can be laid flat for berthing. The contoured seat surfaces may require a mattress placed over the seating surfaces to provide a smooth surface for sleep comfort. The mattresses add weight and consume valuable cargo space in the aircraft. Having a seat that can adapt without the need for mattresses would save fuel and cargo space. To this end, the dynamic structural assemblies disclosed here can be implemented to provide an adjustable seat surface that is suitable for aircraft applications. Certain embodiments of the dynamic seat surface use elastically deformable panels to form actuators, and Bowden cables as actuation mechanisms to move the foundation of the seat cushion for purposes of adapting the seating surface between a flat state and a contoured state. When the system is in a relaxed state, the panels exhibit a virtually flat configuration, allowing the seat to be laid flat for berthing without the need of a mattress. As the seat back is lifted to the reclined or seated position, the panels are expanded by actuating one or more Bowden cables. As the actuators expand, they lift supporting seat panels to create the profile of a comfortable seat.

Figure 2:
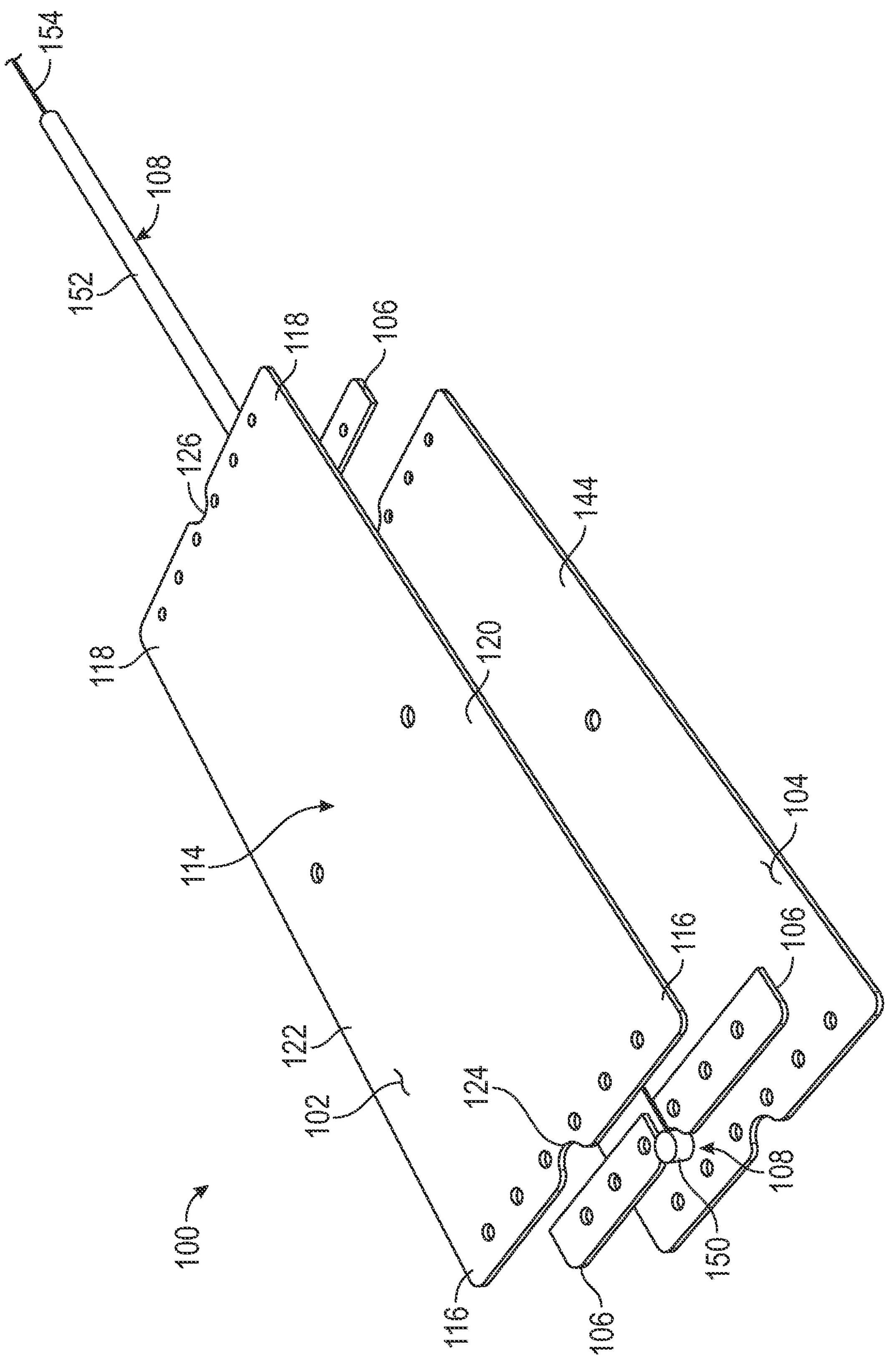
FIG. 2 is an exploded perspective view of the structural assembly.
Figure 3:
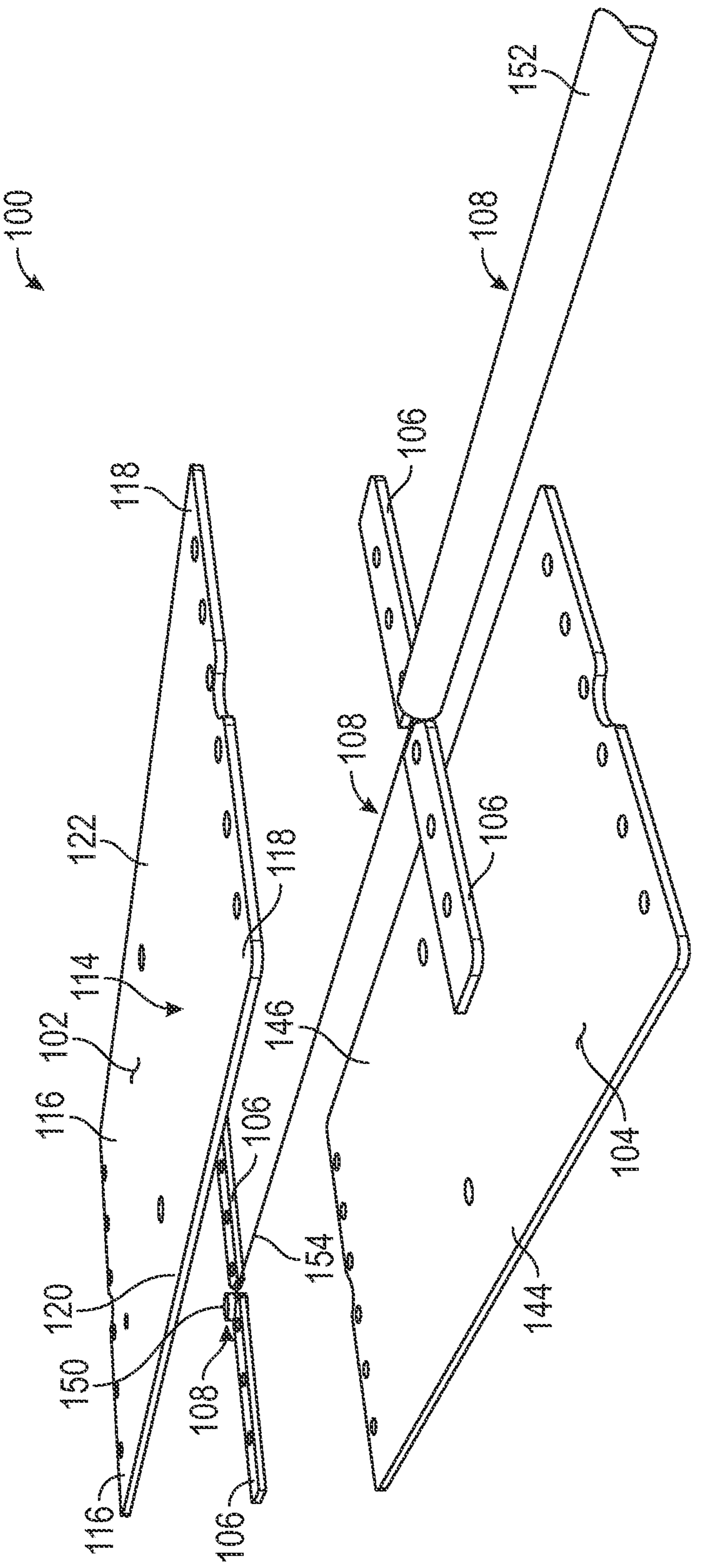
FIG. 3 is another exploded perspective view of the structural assembly.
Figure 4:
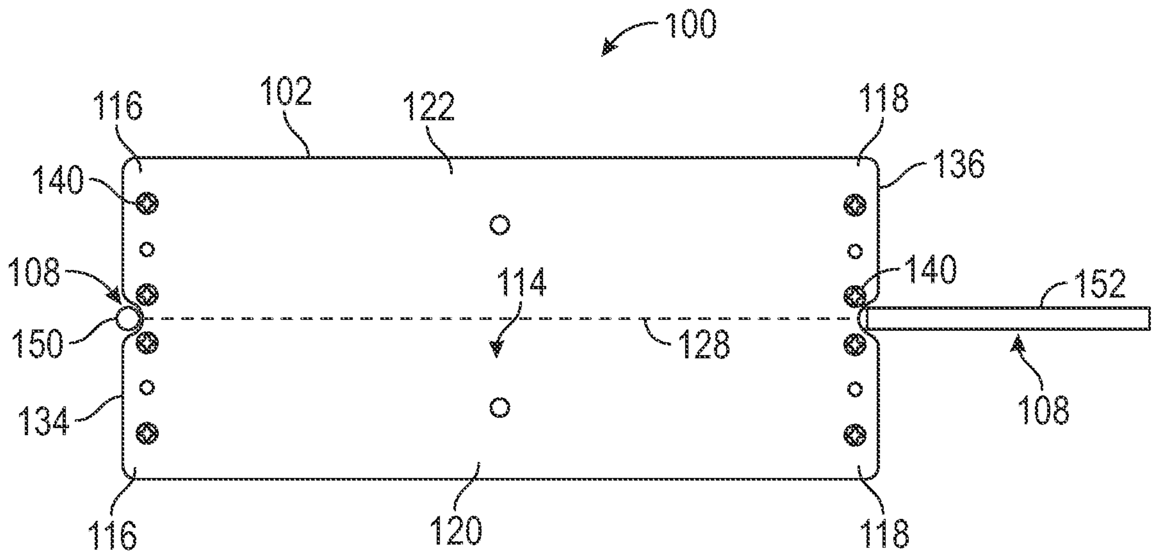
FIG. 4 is a top view of the structural assembly.
Figure 5:
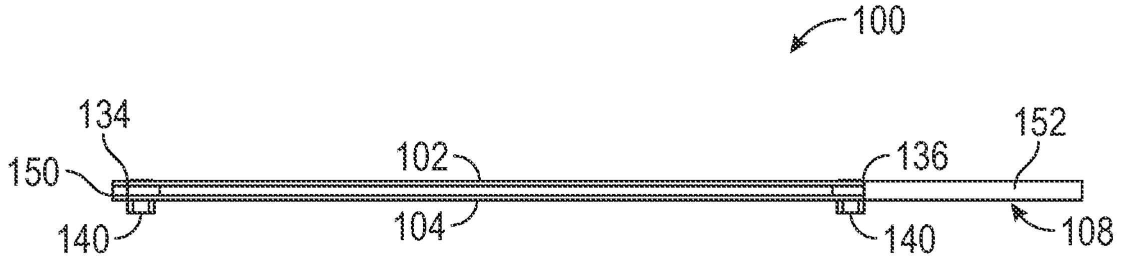
FIG. 5 is a side edge view of the structural assembly.
Figure 6:
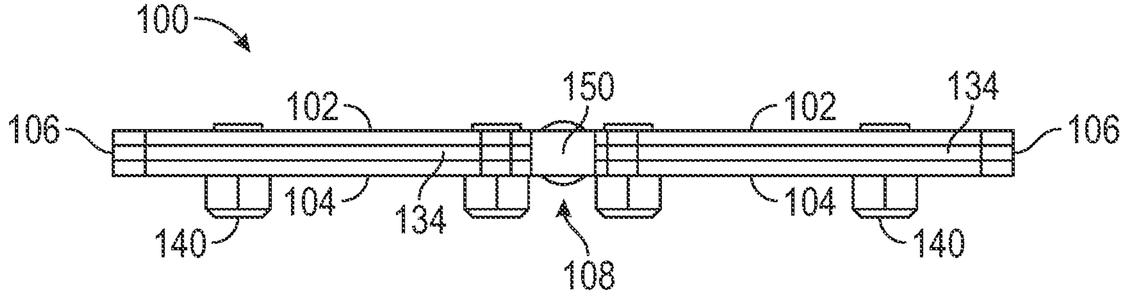
FIG. 6 is a leading edge view of the structural assembly.
Figure 7:
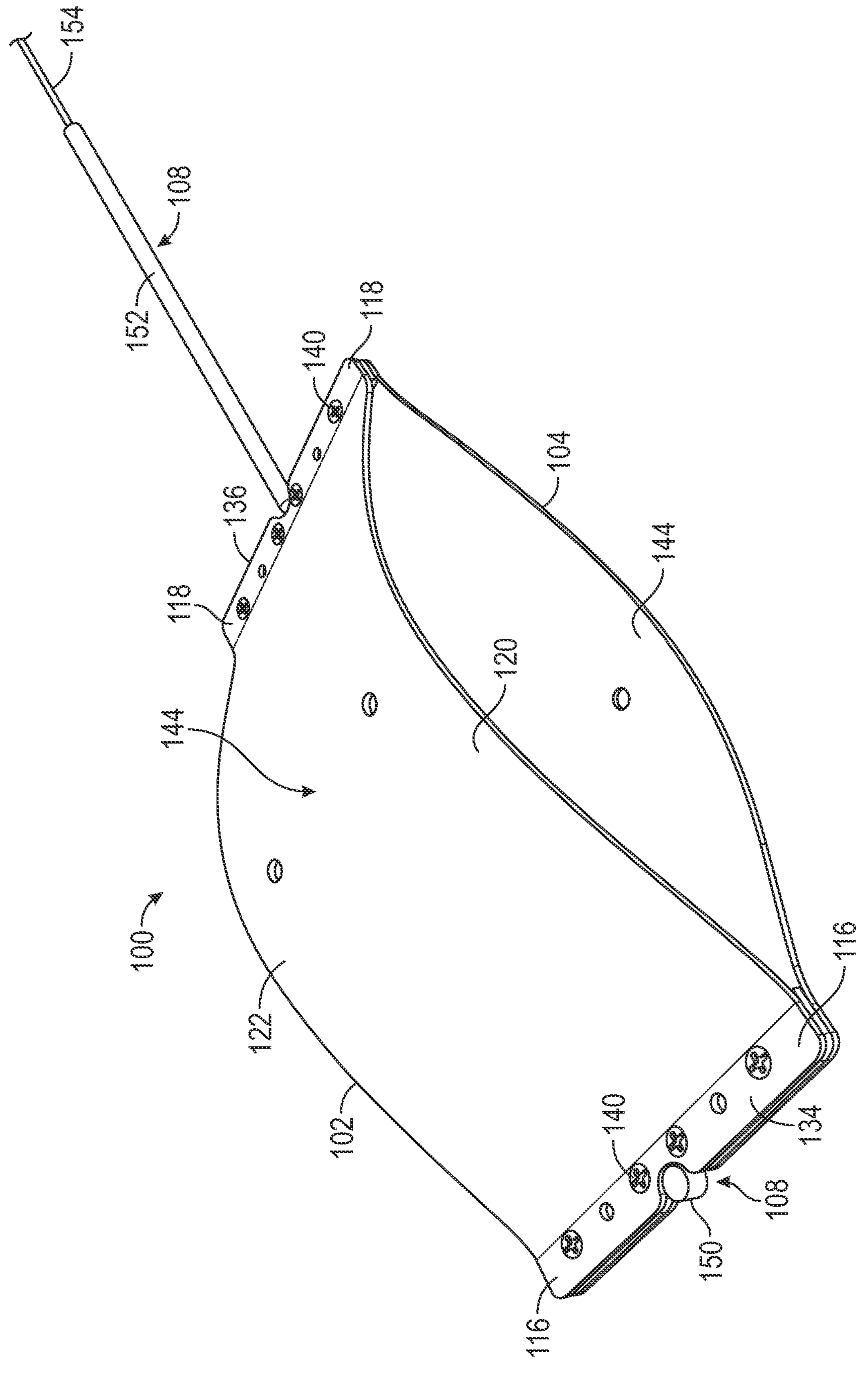
FIG. 7 is a perspective view of the structural assembly, but in a loaded state.
Figure 8:
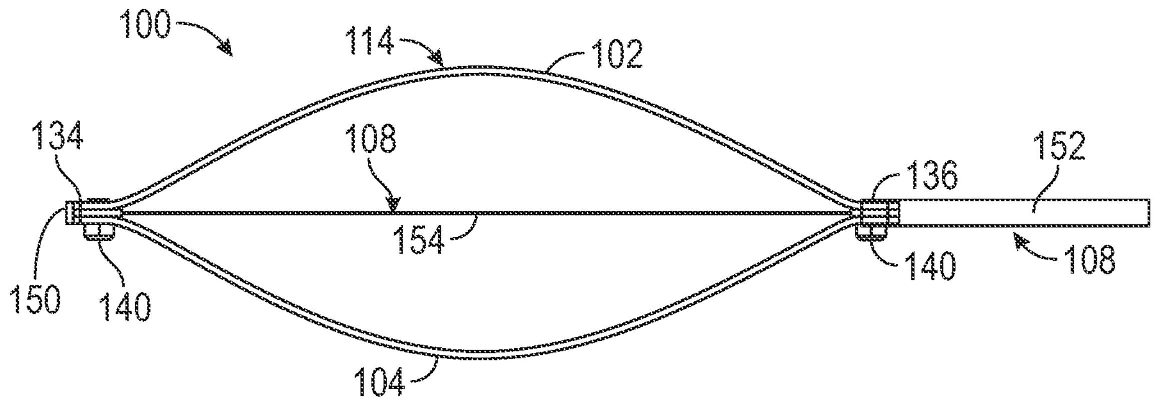
FIG. 8 is a side edge view of the loaded structural assembly.
Figure 9:
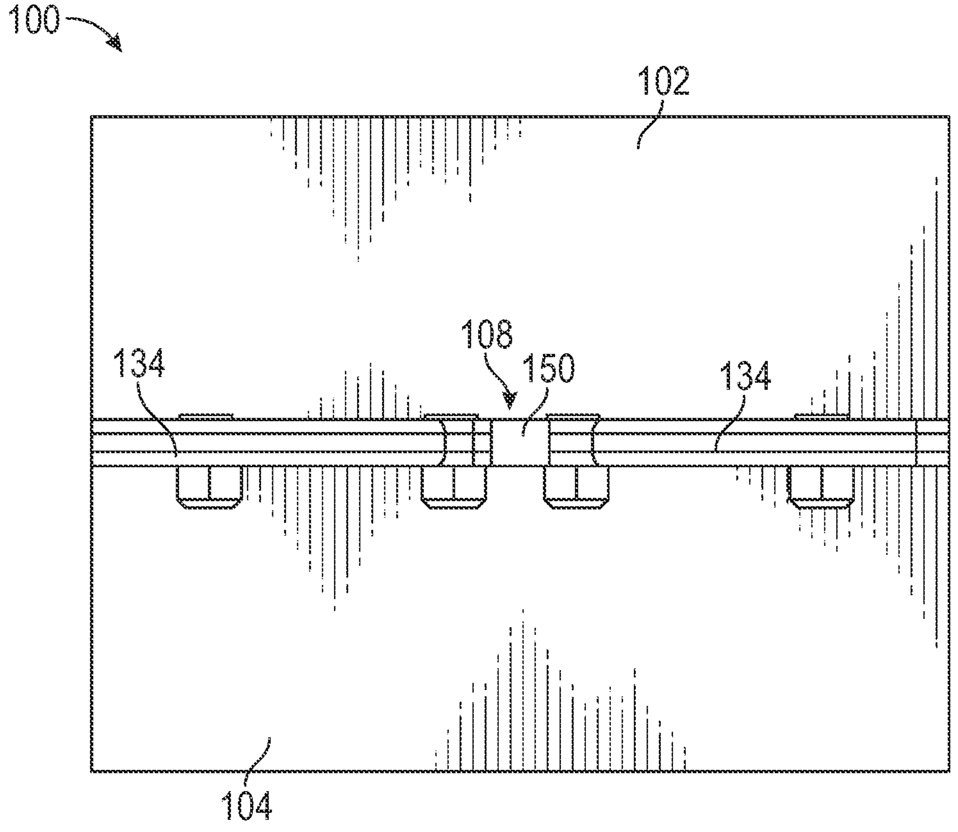
FIG. 9 is a leading edge view of the loaded structural assembly.

Referring to the drawings, FIGS. 1-9 relate to an exemplary embodiment of a mechanically actuatable structural assembly 100. The structural assembly 100 is generally rectangular in shape when viewed from the top or bottom. FIG. 1 is a perspective view of the structural assembly 100 in an unloaded or preloaded state, FIGS. 2 and 3 are exploded perspective views of the unloaded/preloaded structural assembly 100, FIG. 4 is a top view of the unloaded/preloaded structural assembly 100, FIG. 5 is a side edge view of the unloaded/preloaded structural assembly 100, and FIG. 6 is a leading edge view of the unloaded/preloaded structural assembly 100. In contrast, FIG. 7 is a perspective view of the rectangular structural assembly 100 in a loaded or compressed state, FIG. 8 is a side edge view of the loaded/compressed structural assembly 100, and FIG. 9 is a leading edge view of the loaded/compressed structural assembly 100.

The illustrated embodiment of the structural assembly 100 generally includes, without limitation: a first panel 102; a second panel 104; at least one spacer 106; and an actuation assembly 108. The structural assembly 100 may also include or cooperate with an activation mechanism 110 that controls operation of the actuation assembly 108 in the manner described in more detail below. For simplicity and convenience, the activation mechanism 110 is schematically represented in FIG. 1, but is omitted from other figures. The structural assembly 100 has a generally rectangular shape when viewed from the top or the bottom, particularly when in the unloaded/preloaded state (see FIG. 4). Different shapes, sizes, and dimensions can be selected to suit the needs and specifications of the particular application and use case. For example, FIGS. 10-18 illustrate another exemplary embodiment of a mechanically actuatable structural assembly that exhibits a generally trapezoidal shape when viewed from the top or bottom. This disclosure contemplates rectangular embodiments, trapezoidal embodiments, triangular embodiments, polygonal embodiments, etc.

Although not always required, for this particular embodiment the first panel 102 and the second panel 104 are identically shaped and sized. Indeed, the first and second panels 102, 104 may be fabricated as two identical instances of the same component or part. Accordingly, the following detailed description of the first panel 102 also applies to the second panel 104.

The first panel 102 includes an elastically deformable region 114 that includes or is formed from elastic material, a leading edge region 116, a trailing edge region 118 opposing the leading edge region 116, and a pair of opposing side edge regions 120, 122. The elastically deformable region 114 resides between the leading and trailing edge regions 116, 118. In preferred embodiments, the first panel 102 is realized as a one-piece unitary construction, formed from the elastic material. In such preferred embodiments, the elastically deformable region 114 may correspond to the entire area of the first panel 102, or to a substantial portion of the first panel 102. In alternative embodiments, the first panel 102 is fabricated as an assembly of distinct parts, and need not be a unitary construction. In such alternative embodiments, at least the elastically deformable region 114 is fabricated from the elastic material. The remainder of this description assumes that the first and second panels 102, 104 are fabricated as one-piece components from the same elastic material (each panel 102, 104 is an elastically deformable panel, and need not have a distinct, separate, or identifiable elastically deformable region 114).

The elastic material that forms the first and second panels 102, 104 may be any of the following, without limitation: plastic, nylon, metal spring steel, a composite material, a metal sheet, or the like. In preferred embodiments, the elastic material is a thermoplastic acrylic-polyvinyl chloride material, such as KYDEX material. The elastic material has the desired static, dynamic, and mechanical properties that provide the durability, reliability, structural integrity, toughness, and elasticity needed for the applications described here. To this end, the elastic material has properties that enable the first and second panels 102, 104 to support the anticipated loads and applied forces when in the relaxed state and when in a buckled (deployed) state. Likewise, the dimensions of the first and second panels 102, 104, the panel thickness, the uniformity of the panel thickness, and/or other physical characteristics of the first and second panels 102, 104 can be designed and engineered to suit the load-bearing specifications and shape-shifting requirements of the particular applications.

The leading edge region 116 includes a cutout 124 formed therein, and the trailing edge region 118 has a cutout 126 formed therein. The purpose of the cutouts 124, 126 is described below. The first panel 102 includes a panel axis 128 (see FIG. 4), which is defined as extending between the leading edge region 116 and the trailing edge region 118. In accordance with the illustrated embodiment, the panel axis 128 extends between the cutouts 124, 126 and is centered between the two major sides of the first panel 102. Consequently, the first panel 102 is symmetric about the panel axis 128, due to its rectangular shape.

As shown in FIGS. 1 and 4-9, the leading edge region 116 of the first panel 102 is coupled to, integrated with, or formed with the counterpart leading edge region of the second panel 104 to form a joined leading edge region 134. Similarly, the trailing edge region 118 of the first panel 102 is coupled to, integrated with, or formed with the counterpart trailing edge region of the second panel 104 to form a joined trailing edge region 136. One or more spacers 106 can be coupled between the first and second panels 102, 104 at appropriate locations to offset the first and second panels 102, 104 relative to each other. For example, spacers 106 can be installed at or near the leading and trailing edge regions, leaving a gap near the cutouts 124, 126 to accommodate a movable loading element of the actuation assembly 108. The spacers 106 are suitably arranged, configured, and positioned to facilitate movement of the movable loading element between the first and second panels 102, 104 (as described in more detail below). As an alternative (or addition) to the spacers 106, the leading and trailing edge regions of the first panel 102 and/or the second panel 104 can be fabricated with a stepped feature, variable thickness, or any structure that provides the same or equivalent functionality as the spacers 106.

In certain embodiments, the leading edge regions of the panels 102, 104 (with optional spacers 106) are coupled together by way of fasteners, rivets, welding, bonding, adhesive, any combination thereof, or the like. In alternative embodiments, the leading edge regions are seamlessly joined together (which may occur when the first and second panels 102, 104 are integrally formed as a unitary component). Similarly, the trailing edge regions of the panels 102, 104 can be coupled together by way of fasteners, rivets, welding, bonding, adhesive, any combination thereof, or the like. In alternative embodiments, the trailing edge regions can be seamlessly joined together (which may occur when the first and second panels 102, 104 are integrally formed as a unitary component). The embodiments shown in the figures utilize fasteners 140 (e.g., nuts and bolts, machine screws, or the like) to secure the leading and trailing edges together, with spacers 106 sandwiched between the panels. For simplicity and clarity, the fasteners 140 are omitted from FIG. 2 and FIG. 3.

In contrast to the leading and trailing edge regions, the side edge regions of the first and second panels 102, 104 are not directly attached to each other. More specifically, the side edge region 120 of the first panel 102 is not directly attached to the corresponding side edge region 144 of the second panel 104, and the side edge region 122 of the first panel 102 is not directly attached to the corresponding side edge region 146 of the second panel 104. Consequently, the pair of opposing side edge regions 120, 122 of the first panel 102 are free to move, relative to the pair of opposing side edge regions 144, 146 of the second panel 104.

The actuation assembly 108 represents a means for applying a compressive axial load to the joined leading and trailing edge regions 134, 136. In accordance with certain exemplary embodiments, the means for applying includes, is realized as, or cooperates with at least one Bowden cable that is controlled in an appropriate manner to apply the compressive axial load and to remove the compressive axial load (in a continuous manner, an incremental manner, a discrete manner, or the like). Alternatively or additionally, the means for applying includes, is realized as, or cooperates with at least one rod, at least one slat, at least one slider, at least one linkage, at least one piston, and/or at least one cam that is controlled in an appropriate manner to apply the compressive axial load and to remove the compressive axial load (in a continuous manner, an incremental manner, a discrete manner, or the like).

Although not always required, the illustrated embodiment of the actuation assembly 108 includes or is implemented as a Bowden cable, which is controlled by the activation mechanism 110 (schematically depicted in a simplified manner in FIG. 1). Accordingly, the actuation assembly 108 may include, without limitation: a stopper component 150; a jacket component 152; and a movable loading element 154, which may be realized as a flexible cable. As shown in FIGS. 2, 3, and 8, at least a portion of the movable loading element 154 resides between the first and second panels 102, 104.

The stopper component 150 is coupled to or is integrated with the distal end of the movable loading element 154, and it is configured to engage the joined leading edge region 134. The jacket component 152 accommodates passage of the movable loading element 154, and an end of the jacket component 152 is configured to engage the joined trailing edge region 136. More specifically, the stopper component 150 fits within the cutouts 124, while the end of the jacket component 152 fits within the cutouts 126. The stopper component 150 and the jacket component 152 need not be affixed or physically attached to the first and second panels 102, 104. Instead, the stopper component 150 and the jacket component 152 are held in place within the respective cutouts 124, 126 by way of compressive force associated with operation or operating state of the activation mechanism 110. In other words, the activation mechanism 110 is configured to keep the movable loading element 154 under a nominal amount of tension, which urges the stopper component 150 against the curved exterior edge of the cutouts 124, and which urges the jacket component 152 against the curved exterior edge of the cutouts 126.

The stopper component 150 is rigid, durable, and is uncompressible relative to the first and second panels 102, 104. Likewise, the jacket component 152 is rigid, durable, and is uncompressible relative to the first and second panels 102, 104. The static and mechanical properties of the stopper component 150 and the jacket component 152 enable them to impart the desired amount of compressive axial force against the joined leading and trailing edge regions 134, 136. In certain embodiments, the jacket component 152 is realized as a metal tube that receives the movable loading element 154 and allows the movable loading element 154 to slide back and forth within the interior space defined in the jacket component 152. In some embodiments, the jacket component 152 is realized as a length of metal material that is wrapped into a spiral or helix shape to create a hollow space inside a strong and rigid outer wall.

The stopper component 150 cooperates with the jacket component 152 during operation of the structural assembly 100. As schematically depicted in FIG. 1, the distal end of the jacket component 152 engages the joined trailing edge region 136, and the proximal end of the jacket component 152 engages or abuts a wall, a plate, a bulkhead, a frame element, or any suitably configured support structure 160. The arrangement of the jacket component 152 between the support structure 160 and the joined trailing edge region 136 keeps the joined trailing edge region 136 in a stationary position during actuation.

The activation mechanism 110 is controllable to pull the movable loading element 154 from an extended state to a retracted state, and to release the movable loading element 154 from a retracted state to an extended state. An embodiment of the activation mechanism 110 may include one or more electric motors, gears, spools, levers, linkages, a pneumatic subsystem, an electronic control unit, etc. The activation mechanism 110 can be suitably configured to control the operation of any number of actuation assemblies 108 in a concurrent or individual manner, as appropriate for the particular application.

In accordance with the illustrated embodiment, the panel axis 128 extends between the joined leading edge region 134 and the joined trailing edge region 136, and the movable loading element 154 extends and retracts along an actuation axis that is parallel to the panel axis 128. For this particular embodiment, the actuation axis of the movable loading element 154 corresponds to (or substantially/nearly corresponds to) the panel axis 128.

When the movable loading element 154 is in a fully extended state (as depicted in FIG. 1), the elastically deformable region 114 of the first panel 102 is unloaded or preloaded to maintain a relaxed shape of the first panel 102, and the elastically deformable region of the second panel 104 is also unloaded or preloaded to maintain a relaxed shape of the second panel 104. In certain embodiments, the relaxed shape of the first and second panels 102, 104 is flat or nearly flat. Alternatively, the relaxed shape of the panels 102, 104 may be contoured or curved by design.

When the movable loading element 154 is in a retracted state, the elastically deformable region 114 of the first panel 102 is subjected to compressive axial loading (imparted by the stopper component 150 and the jacket component 152) that causes the elastically deformable region 114 to buckle into a loaded shape. Likewise, the elastically deformable region of the second panel 104 is subjected to compressive axial loading that causes the elastically deformable region of the second panel 104 to buckle into a loaded shape. FIGS. 7-9 depict the structural assembly 100 in a loaded state, where the first panel 102 and the second panel 104 buckle away from each other in opposite directions.

Retraction of the movable loading element 154 (e.g., by controlling the operation of the activation mechanism 110 in an appropriate manner) causes the stopper component 150 and the jacket component 152 of the actuation assembly 108 to apply compressive force against the joined leading edge region 134 and the joined trailing edge region 136. The resulting compressive axial loading causes the elastically deformable first panel 102 to adaptively buckle into a corresponding loaded shape, and causes the elastically deformable second panel 104 to adaptively buckle into a corresponding loaded shape. More specifically, the elastically deformable region 114 of the first panel 102 buckles away from the elastically deformable region of the second panel 104, and vice versa.

Retracting the movable loading element 154 pulls the stopper component 150 toward the distal end of the jacket component 152, which brings the joined leading edge region 134 closer to the joined trailing edge region 136, and which results in buckling of the first and second panels 102, 104 (see FIG. 7). Accordingly, application of the compressive axial load decreases the distance between the joined leading edge region 134 and the joined trailing edge region 136, increases the distance between the side edge regions 120, 144, and increases the distance between the side edge regions 122, 146. In accordance with the exemplary embodiments presented here, the maximum distance between the first and second panels 102, 104 increases as a function of the compressive force/load applied against the joined leading edge region 134 and the joined trailing edge region 136. In other words, the amount of buckling of the first and second panels 102, 104 is responsive to the axial compressive load imparted by the actuation assembly 108. Consequently, the overall height, the shape, and/or the volume occupied by the structural assembly 100 can be controlled in a dynamic and adaptive manner by the activation mechanism 110.

The activation mechanism 110 is also controllable to release the movable loading element 154 from a retracted state to an extended state. Extension of the movable loading element 154 reduces the amount of compressive axial force/loading applied by the stopper component 150 and the jacket component 152. Removal or reduction of the compressive axial force/load increases the distance between the joined leading edge region 134 and the joined trailing edge region 136, causes the first elastically deformable panel 102 to flatten, and causes the second elastically deformable panel 104 to flatten. The movable loading component 154 can be extended such that the stopper component 150 and the joined leading edge region 134 move away from the distal end of the jacket component 152 and the joined trailing edge region 136. This action causes the buckled panels 102, 104 to relax and move closer together, eventually returning to their nominal relaxed or uncompressed states. Reduction or removal of the compressive axial load causes the elastically deformable panels 102, 104 to return to their respective relaxed or preloaded shapes.

Figure 10:
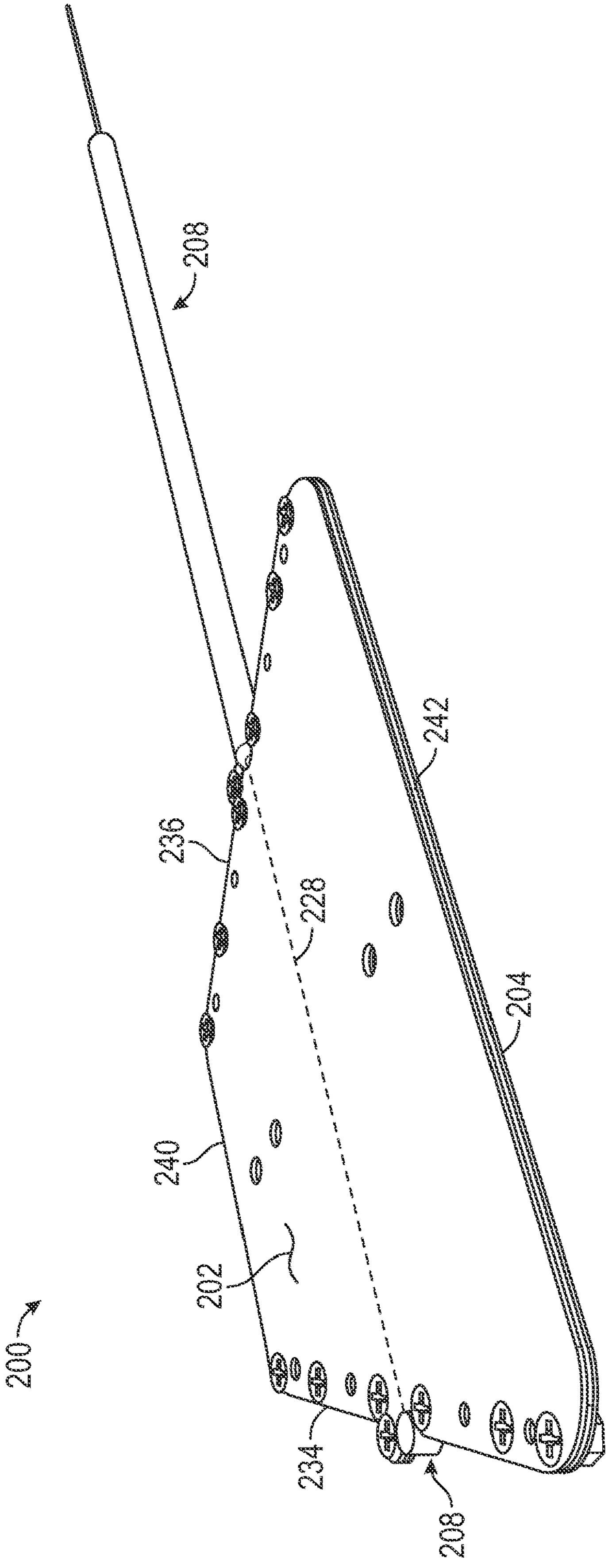
FIG. 10 is a perspective view of an exemplary embodiment of a mechanically actuatable trapezoidal structural assembly, in an unloaded or preloaded state.
Figure 11:
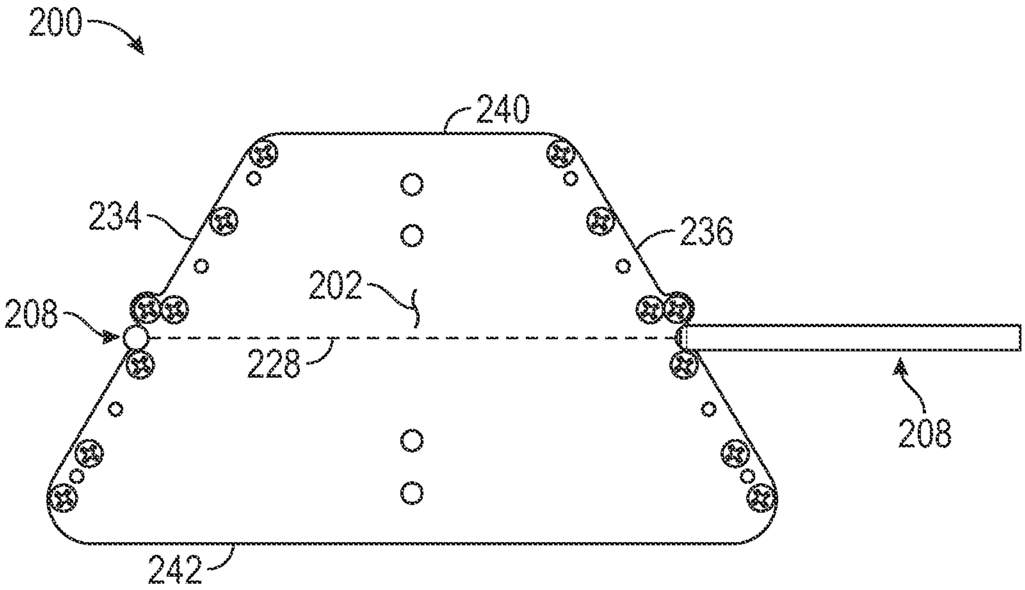
FIG. 11 is a top view of the trapezoidal structural assembly.
Figure 12:
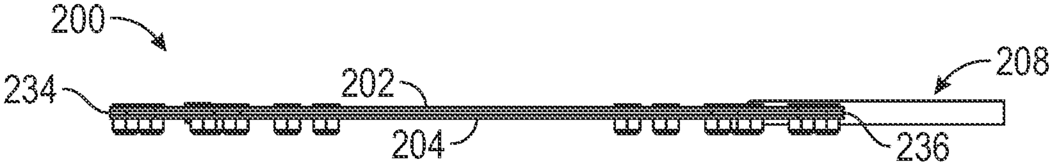
FIG. 12 is a side edge view of the trapezoidal structural assembly.
Figure 13:
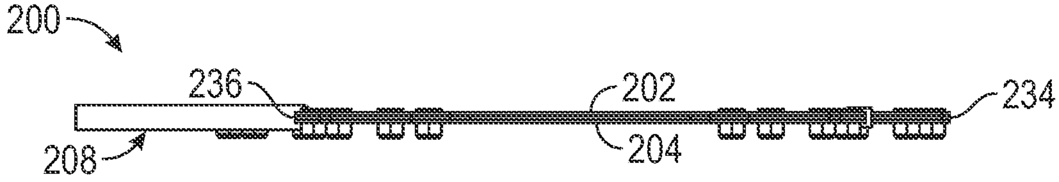
FIG. 13 is an opposing side edge view of the trapezoidal structural assembly.
Figure 14:
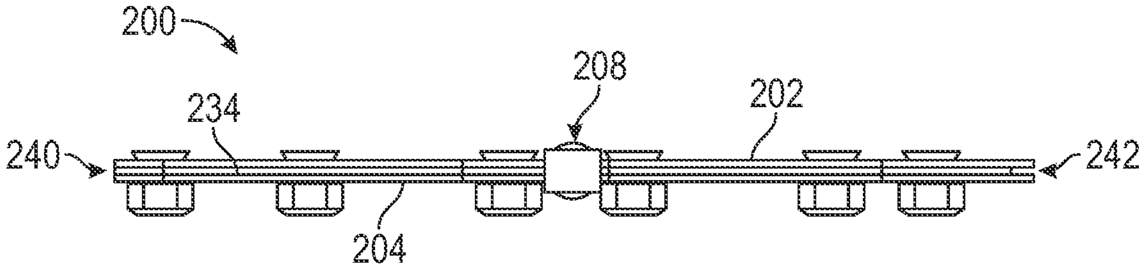
FIG. 14 is a leading edge view of the trapezoidal structural assembly.
Figure 15:
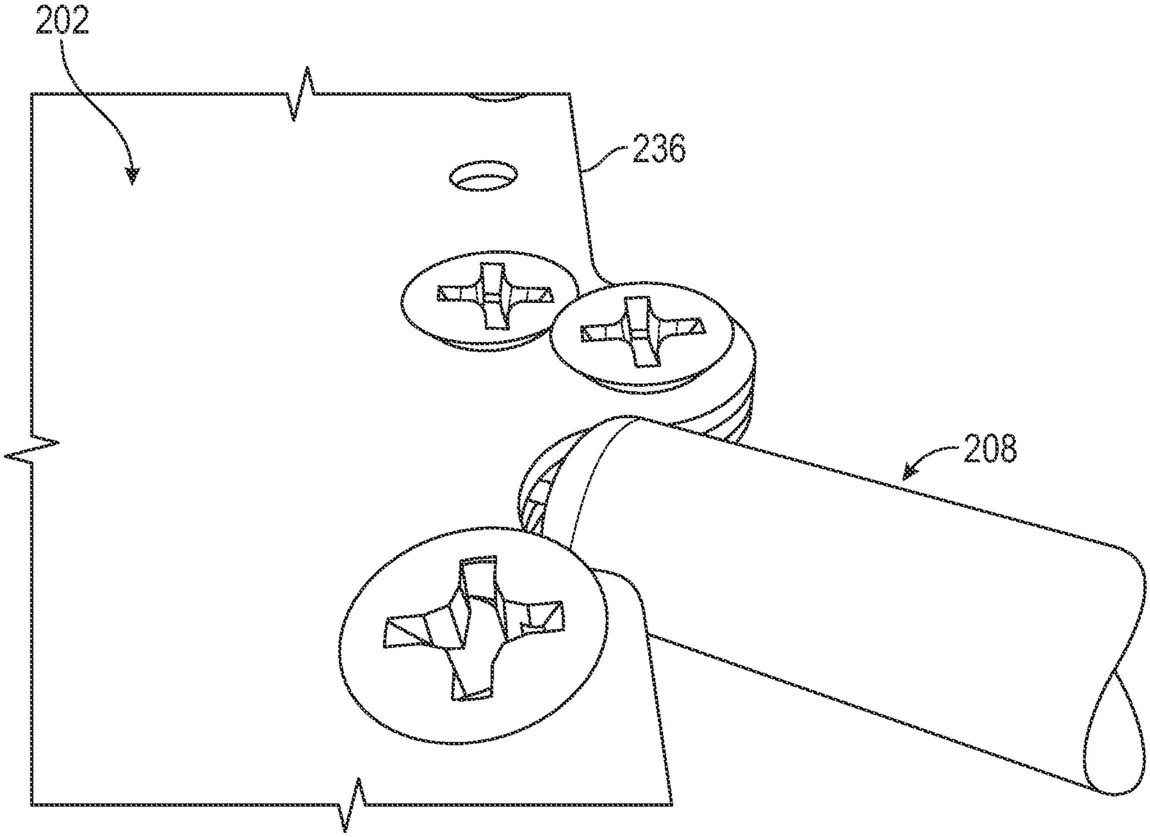
FIG. 15 is a perspective view of a portion of the trapezoidal structural assembly.
Figure 16:
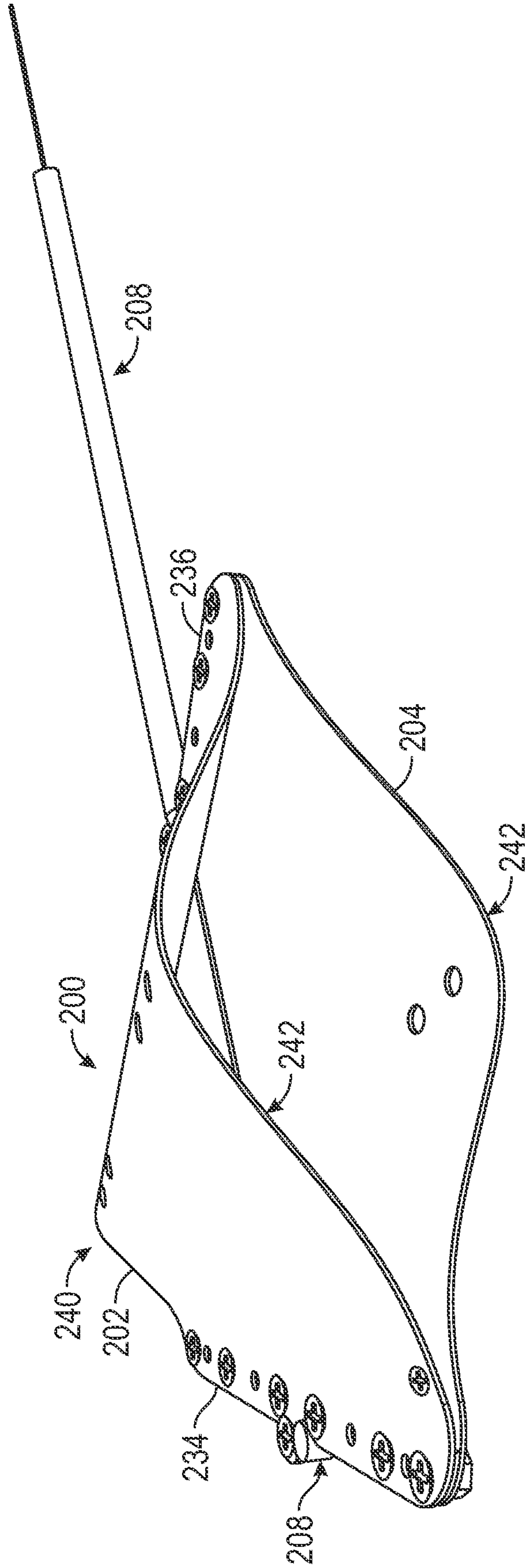
FIG. 16 is a perspective view of the trapezoidal structural assembly, but in a loaded state.
Figure 17:
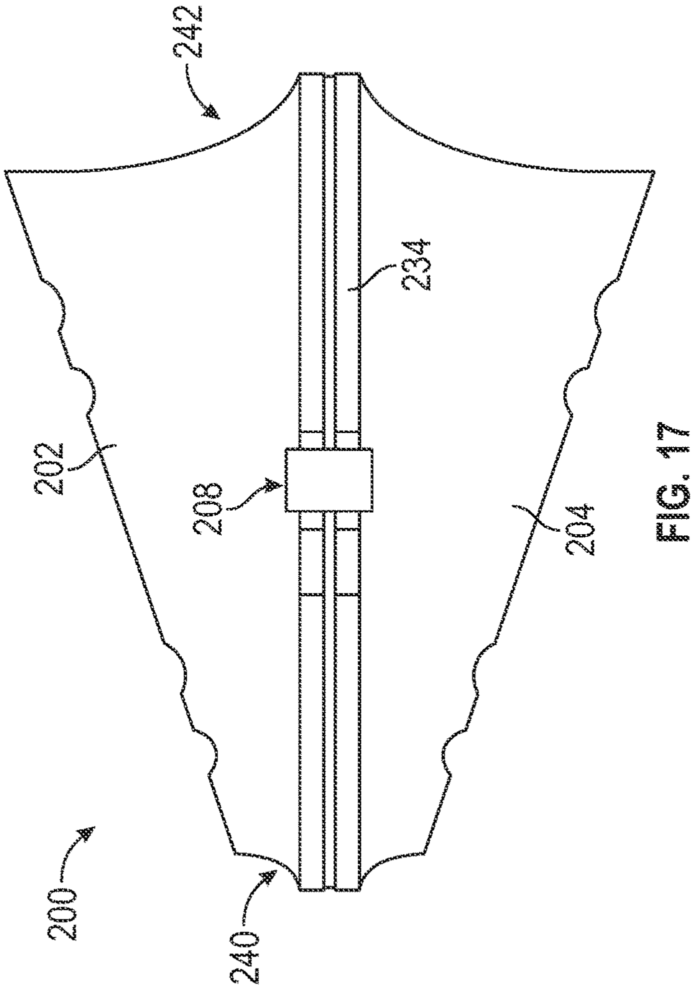
FIG. 17 is a leading edge view of the loaded trapezoidal structural assembly.
Figure 18:
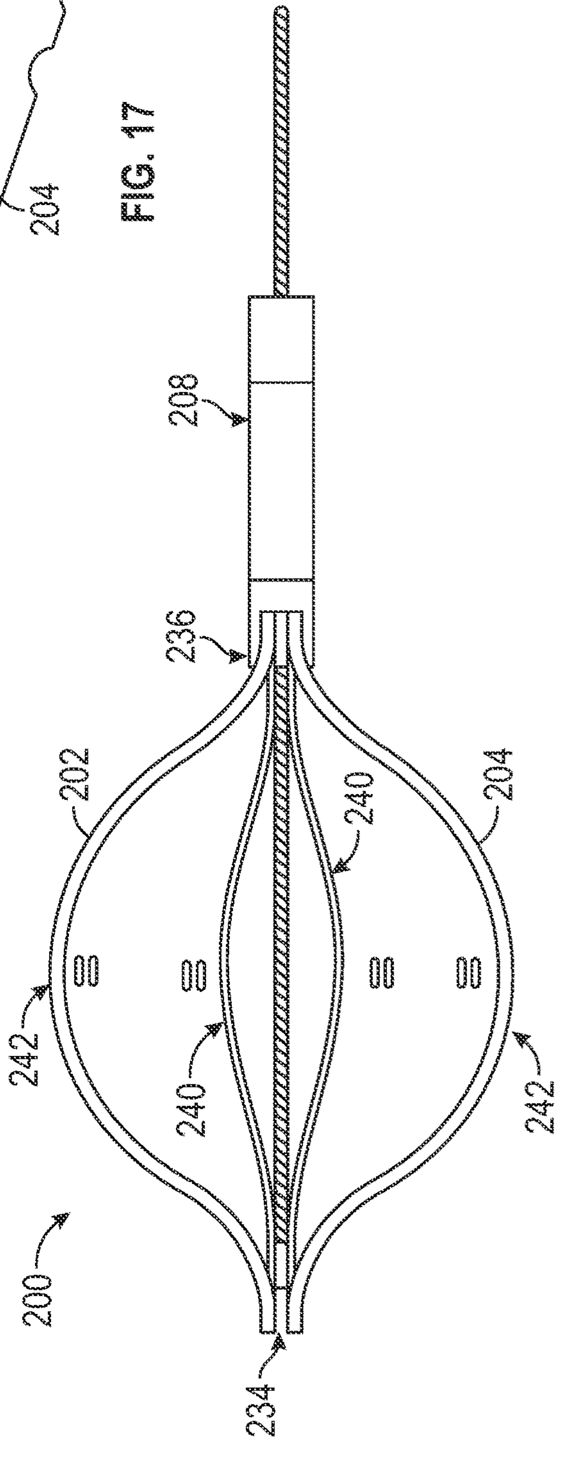
FIG. 18 is a side edge view of the loaded structural assembly.

As mentioned above, a mechanically actuatable structural assembly having certain shape-shifting characteristics can be sized, configured, and arranged to have any desired shape, outline, profile, and dynamic properties. For example, the embodiment described above with reference to FIGS. 1-9 is generally rectangular in shape. As another non-limiting example, FIGS. 10-18 relate to an embodiment of a mechanically actuatable structural assembly 200 that is generally trapezoidal in shape when viewed from the top or bottom. FIG. 10 is a perspective view of the trapezoidal structural assembly 200 in an unloaded (or preloaded) state, FIG. 11 is a top view of the unloaded trapezoidal structural assembly 200, FIG. 12 is a side edge view of the unloaded trapezoidal structural assembly 200, FIG. 13 is an opposing side edge view of the unloaded trapezoidal structural assembly 200, FIG. 14 is a leading edge view of the unloaded trapezoidal structural assembly 200, and FIG. 15 is a perspective view of a portion of the unloaded trapezoidal structural assembly 200. In contrast, FIG. 16 is a perspective view of the trapezoidal structural assembly 200 in a loaded state, FIG. 17 is a leading edge view of the loaded trapezoidal structural assembly 200, and FIG. 18 is a side edge view of the loaded structural assembly 200.

A number of features, elements, components, and functional characteristics of the trapezoidal structural assembly 200 are identical, similar, or equivalent to that described above for the rectangular structural assembly 100. Accordingly, common or shared or equivalent aspects of the structural assemblies 100, 200 may not be redundantly described in a fulsome manner below.

The illustrated embodiment of the trapezoidal structural assembly 200 generally includes, without limitation: a first panel 202; a second panel 204; at least one spacer located between the first and second panels 202, 204; and an actuation assembly 208. The structural assembly 200 has a generally trapezoidal shape when viewed from the top or the bottom, particularly when in the unloaded/preloaded state (see FIG. 11). For this exemplary embodiment, a panel axis 228 is defined to extend between two edges of the structural assembly 200. In this regard, the first and second panels 202, 204 are configured and arranged to include a joined leading edge region 234 and a joined trailing edge region 236 that opposes the joined leading edge region 234. The panel axis 228 extends between the joined leading edge region 234 and the joined trailing edge region 236, and generally corresponds to the longitudinal actuation axis of the actuation assembly 208 (when the structural assembly 200 is in the relaxed or unloaded state as shown).

In accordance with certain embodiments, such as the trapezoidal structural assembly 200 depicted here, the first and second panels 202, 204 are asymmetric about the actuation axis. As shown in FIG. 11, the structural assembly 200 includes a short side edge 240 and a long side edge 242. The side edges 240, 242 extend between the joined leading and trailing edge regions 234, 236. This type of asymmetry causes the first and second panels 202, 204 to buckle in a manner that creates an angled height profile. More specifically, the first and second panels 202, 204 expand at the short side edge 240 by a first separation distance, and expand at the long side edge 242 by a second separation distance that is greater than the first separation distance (see FIGS. 16-18). Accordingly, the apex of the buckled surface of the first panel 202 has a variable height, relative to the unbuckled surface. Similarly, the apex of the buckled surface of the second panel 204 has a variable height, relative to the unbuckled surface. The angled nature of the buckled surfaces is clearly depicted in FIG. 17.

Figure 19:
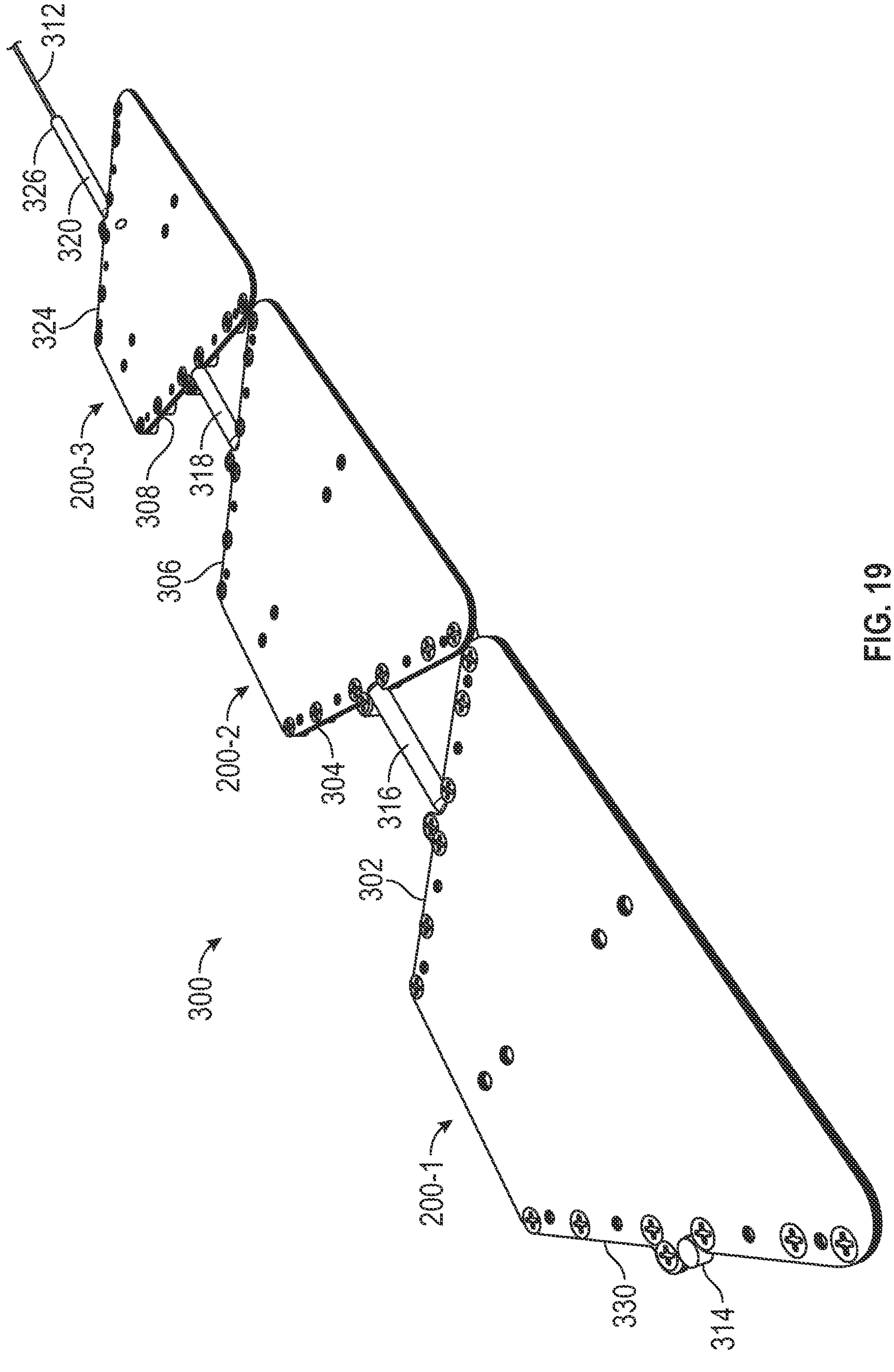
FIG. 19 is a perspective view of an exemplary embodiment of an arrangement that includes multiple instantiations of the trapezoidal structural assembly.

FIGS. 1-9 depict a single instantiation of the rectangular structural assembly 100, and FIGS. 10-18 depict a single instantiation of the trapezoidal structural assembly 200. In certain applications, a plurality of mechanically actuatable structural assemblies of the type described here can be coupled together (e.g., in series) and actuated with a single actuation assembly that is controlled by a single activation mechanism. For example, FIG. 19 is a perspective view of a non-limiting exemplary embodiment of an arrangement 300 that includes multiple instantiations of the trapezoidal structural assembly 200 described above. Although the illustrated embodiment includes three structural assemblies 200 coupled together in series, any number of structural assemblies 200 can be linked together to address the needs of the particular application.

The exemplary embodiment shown in FIG. 19 includes a first structural assembly 200-1, a second structural assembly 200-2, and a third structural assembly 200-3 coupled in series. More specifically, the trailing edge 302 of the first structural assembly 200-1 is adjacent to the leading edge 304 of the second structural assembly 200-2, and the trailing edge 306 of the second structural assembly 200-2 is adjacent to the leading edge 308 of the third structural assembly 200-3 (such that the second structural assembly 200-2 is flanked by the first and third structural assemblies 200-1, 200-3). The arrangement 300 includes an actuation assembly that includes or is based on a Bowden cable configuration. To this end, the actuation assembly includes, without limitation: a movable loading element 312; a stopper component 314 affixed to or integrated with the distal end of the movable loading element 312; a first jacket component 316 positioned between the trailing edge 302 and the leading edge 304; a second jacket component 318 positioned between the trailing edge 306 and the leading edge 308; and a third jacket component 320 that engages the trailing edge 324 of the third structural assembly 200-3. Although not shown in FIG. 19, the proximal end 326 of the third jacket component 320 may be held in a fixed position relative to the structural assemblies 200 to accommodate actuation of the arrangement 300 by way of the movable loading element 312 (in the manner described above).

FIG. 19 shows the arrangement 300 in the relaxed and unloaded state. Retraction of the movable loading element 312 increases the axial compressive force imparted against the leading edge 330 of the first structural assembly 200-1 and the trailing edge 324 of the third structural assembly 200-3. Continued retraction of the movable loading element increases the compressive force until the three structural assemblies 200 buckle in the manner described above. The uncompressible nature of the jacket components 316, 318 maintain spacing between the structural assemblies 200, while accommodating the buckling action caused by retraction of the movable loading element 312. Extension of the movable loading element 312 allows the structural assemblies 200 to relax, flatten, and eventually return to the unloaded condition shown in FIG. 19.

Figure 20:
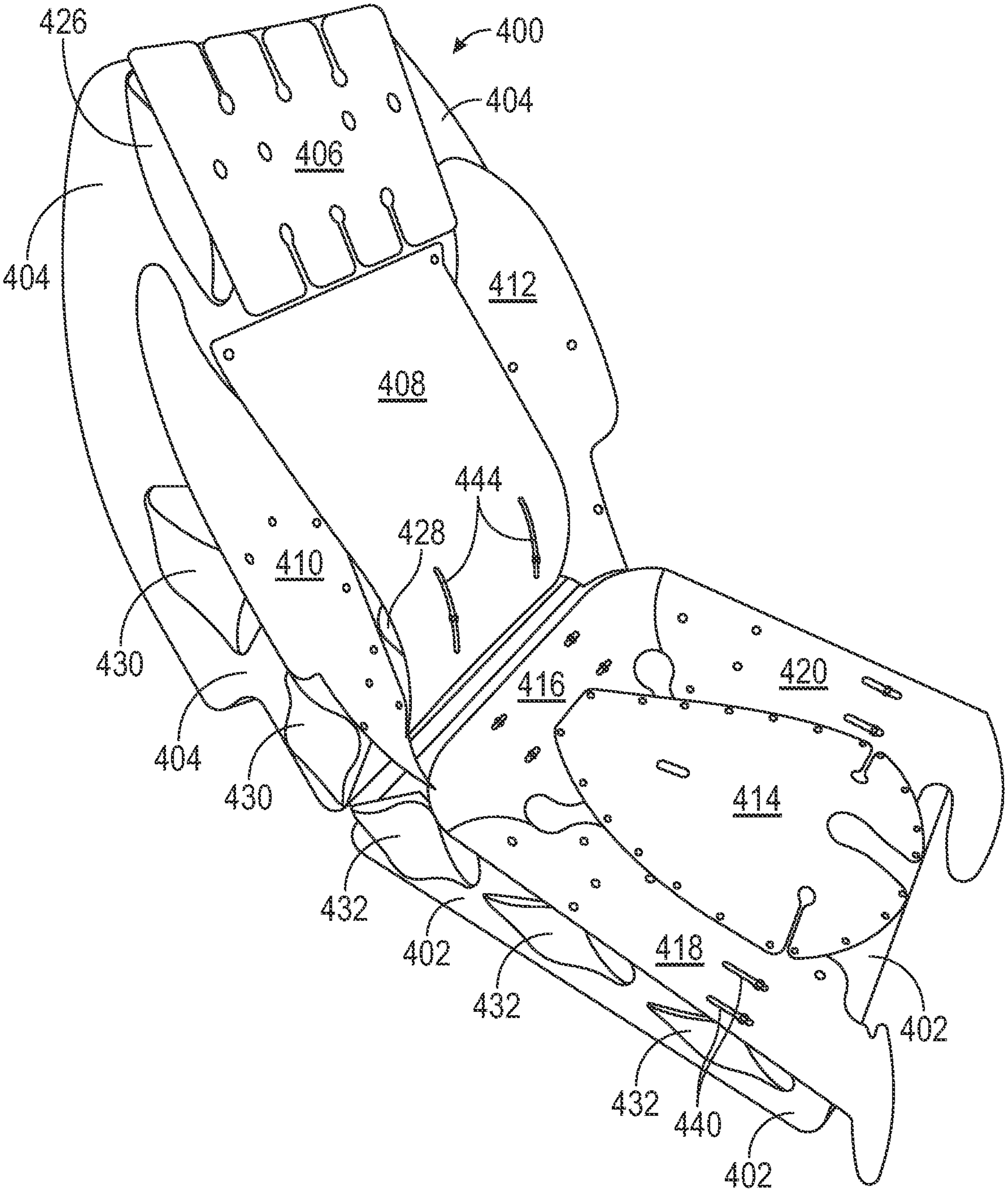
FIG. 20 is a perspective view that depicts internal support structures and components of a vehicle seat.

Any number of individual structural assemblies (of the type described here) and/or any number of series-connected arrangements of structural assemblies (of the type described here) can be utilized to create at least one adaptive shape-shifting surface of a seating system, e.g., a vehicle seat, a theater seat, a couch or divan, or the like. In this regard, an embodiment of a seating system can include or cooperate with at least one instance of a mechanically actuatable structural assembly having the features and functionality described here. As one non-limiting example, FIG. 20 is a perspective view that depicts internal support structures and components of a vehicle seat, which may be implemented as an aircraft seat 400 that can be adjusted between an upright position (suitable for takeoff and landing) and a relatively flat berth position (suitable for sleeping).

The depicted aircraft seat 400 includes foundational support structure, a number of movable support surfaces overlying the support structure, and a number of mechanically actuatable structural assemblies located between the support structure and the movable support surfaces. Actuation of the structural assemblies can be controlled as needed to respond to changes in the position of the aircraft seat 400 (e.g., the upright position, the berth position, and various positions therebetween). Actuation of the structural assemblies results in buckling of the respective panels, which expands the structural assemblies (increases height). Buckling of the panels results in movement or shape shifting of the overlying movable support surfaces. Thus, the occupant-facing surface of the aircraft seat 400 can be adaptively adjusted to be relatively flat in the berth position, and adaptively adjusted to be contoured, curved, or shaped to enhance occupant comfort in non-berth positions.

The illustrated embodiment of the aircraft seat 400 generally includes, without limitation: a seat cushion base 402; a seat back base 404; a movable headrest support surface 406; a movable back support surface 408; a movable right bolster support surface 410; a movable left bolster support surface 412; a movable seat support surface 414; a movable rear seat support surface 416; a movable right seat support surface 418; and a movable left seat support surface 420. The aircraft seat 400 also includes, without limitation: at least one mechanically actuatable structural assembly 426 associated with the headrest support surface 406; at least one mechanically actuatable structural assembly 428 associated with the back support surface 408 (most of the structural assembly 428 is hidden from view); at least one mechanically actuatable structural assembly 430 associated with the right bolster support surface 410; at least one mechanically actuatable structural assembly (hidden from view) associated with the left bolster support surface 412; at least one mechanically actuatable structural assembly 432 associated with the right seat support surface 418; at least one mechanically actuatable structural assembly (hidden from view) associated with the left seat support surface 420; at least one mechanically actuatable structural assembly (hidden from view) associated with the rear seat support surface 416; and at least one mechanically actuatable structural assembly (hidden from view) associated with the seat support surface 414.

Most (if not all) of the actuatable structural assemblies are controlled and adjusted in concert, such that the shapes of the different support surfaces are changed in a concurrent manner. In certain embodiments, one or more of the actuatable structural assemblies can be individually controlled on demand. For example, it may be desirable to provide separate and individual control of the headrest support surface 406 and/or the back support surface 408 (for lumbar support).

The top/outer panel of the structural assembly 426 can be attached to the headrest support surface 406 in a fixed (non-moving) manner. In contrast, the bottom/inner panel of the structural assembly 426 can be free to move relative to the engaged surface of the seat back base 404. This allows the bottom/inner panel of the structural assembly 426 to slide and translate along the seat back base 404 as needed during operation of the structural assembly 426.

The depicted implementation utilizes two structural assemblies 430 coupled to the right bolster support surface 410. The two structural assemblies 430 can be coupled in series and actuated with a single mechanism (as explained above). The top/outer panel of the structural assembly 430 can be attached to the right bolster support surface 410 in a fixed (non-moving) manner. In contrast, the bottom/inner panel of the structural assembly 430 can be free to move relative to the engaged surface of the seat back base 404. This allows the bottom/inner panel of the structural assembly 430 to slide and translate along the seat back base 404 as needed during operation of the structural assembly 430. Although not separately shown in FIG. 20, two structural assemblies 430 can be coupled to the left bolster support surface 412 in a similar manner.

The depicted implementation utilizes three structural assemblies 432, which may be coupled in series and actuated with a single mechanism (as explained above). The top/outer panel of the structural assembly 432 can be attached to the right seat support surface 418 or to the rear seat support surface 416 in a fixed (non-moving) manner. Alternatively, the top/outer panel of the structural assembly 432 can be coupled to the right seat support surface 418 in a slidable or otherwise movable manner. In this regard, the right seat support surface 418 includes two mounting slots 440 formed therein to accommodate fasteners for the structural assembly 432. The slots 440 accommodate movement of the structural assembly 432 during operation. The bottom/inner panel of the structural assembly 432 can be free to move relative to the engaged surface of the seat cushion base 402. This allows the bottom/inner panel of the structural assembly 432 to slide and translate along the seat cushion base 402 as needed during operation of the structural assembly 432. Although not separately shown in FIG. 20, three structural assemblies 432 can be coupled to the left seat support surface 420 in a similar manner.

The top/outer panel of the structural assembly 428 can be coupled to the back support surface 408 in a slidable or otherwise movable manner. In this regard, the back support surface 408 includes two mounting slots 444 formed therein to accommodate fasteners for the structural assembly 428. The slots 444 accommodate movement of the structural assembly 428 during operation. The bottom/inner panel of the structural assembly 428 can be free to move relative to the engaged surface of the seat back base 404. This allows the bottom/inner panel of the structural assembly 428 to slide and translate along the seat back base 404 as needed during operation of the structural assembly 428.

The rear seat support surface 416 and the seat support surface 414 are adaptively adjusted using their respective actuatable structural assemblies, which are hidden from view in FIG. 20. The corresponding structural assemblies can be fixedly or movably attached to their overlying support surfaces, as needed or desired. Similarly, the corresponding structural assemblies can be fixedly or movably attached to the underlying seat cushion base 402, as needed or desired.

Figure 21:
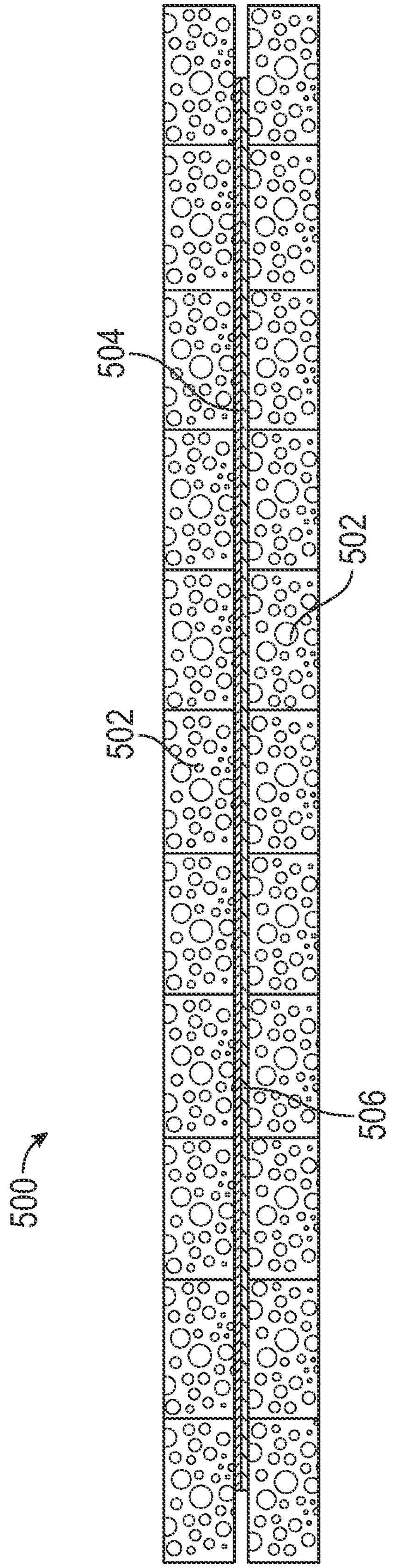
FIG. 21 is a side edge view of an exemplary embodiment of a mechanically actuatable structural assembly that includes foam or cushioning material.

FIG. 20 shows the movable underlying structure and components of the aircraft seat 400. When fully assembled, the aircraft seat 400 will have cushioning material and overlying finish material (e.g., an exposed fabric, an exposed leather covering, or other outer material) of the type normally used with seating systems. In accordance with certain exemplary embodiments, a mechanically actuatable structural assembly of the type described above includes cushioning material attached thereto or integrated therein. In this regard, FIG. 21 is a side edge view of an exemplary embodiment of a mechanically actuatable structural assembly 500 that includes foam or cushioning material 502. FIG. 21 shows the structural assembly 500 in its relaxed or unloaded state. The cushioning material 502 may be coupled to an exterior of the top panel 504, coupled to an exterior of the bottom panel 506, or coupled to both the top and bottom panels 504, 506.

The cushioning material 502 may be realized as a physically distinct layer of foam or other resilient material that is glued, bonded, or otherwise affixed to the top and bottom panels 504, 506. Alternatively or additionally, the cushioning material 502 can be applied to the top and bottom panels 504, 506 during fabrication, such that the top and bottom panels 504, 506 are embedded in or surrounded by the cushioning material 502. The cushioning material 502 is flexible and resilient enough to bend, move, expand, and contract as needed in response to buckling of the structural assembly 500. Moreover, the cushioning material 502 has static and dynamic properties and characteristics to provide seating comfort to occupants of a seat that incorporates the structural assembly 500. Consequently, the cushioned structural assembly 500 can be utilized in a seating system without having an overlying support surface or component, and without requiring an additional layer of cushioning material, another foam component, or extra padding layers.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A mechanically actuatable structural assembly comprising:

a first panel comprising: a first elastically deformable region formed from elastic material; a first leading edge region; a first trailing edge region opposing the first leading edge region; and a first pair of opposing side edge regions, wherein the first elastically deformable region resides between the first leading edge region and the first trailing edge region;

a second panel comprising: a second elastically deformable region formed from elastic material; a second leading edge region rigidly coupled to the first leading edge region to form a joined leading edge region; a second trailing edge region opposing the second leading edge region and rigidly coupled to the first trailing edge region to form a joined trailing edge region; and a second pair of opposing side regions, wherein the second elastically deformable region resides between the second leading edge region and the second trailing edge region, and wherein the second pair of opposing side edge regions are free to move relative to the first pair of opposing side edge regions; and an actuation assembly comprising: a first component configured to engage the joined leading edge region; a second component configured to engage the joined trailing edge region; and a movable loading element coupled to the first component and cooperating with the second component, at least a portion of the movable loading element residing between the first and second panels; wherein:

when the movable loading element is in an extended state, the first elastically deformable region is unloaded or preloaded to maintain a first relaxed shape, and the second elastically deformable region is unloaded or preloaded to maintain a second relaxed shape; and when the movable loading element is in a retracted state, the first elastically deformable region is subjected to compressive axial loading that causes the first elastically deformable region to buckle into a first loaded shape, and the second elastically deformable region is subjected to compressive axial loading that causes the second elastically deformable region to buckle into a second loaded shape.

2. The mechanically actuatable structural assembly of claim 1, further comprising a panel axis defined as extending between the joined leading edge region and the joined trailing edge region, wherein the movable loading element extends and retracts along an actuation axis that is parallel to the panel axis.

3. The mechanically actuatable structural assembly of claim 2, wherein the first and second panels are asymmetric about the actuation axis.

4. The mechanically actuatable structural assembly of claim 1, wherein:

retraction of the movable loading element causes the first and second components of the actuation assembly to apply compressive force against the joined leading edge region and the joined trailing edge region; and extension of the movable loading element reduces the compressive force applied by the first and second components of the actuation assembly.

5. The mechanically actuatable structural assembly of claim 4, wherein:

retraction of the movable loading element causes the first elastically deformable region of the first panel to buckle away from the second elastically deformable region of the second panel; and a maximum distance between the first and second panels increases as a function of the compressive force applied against the joined leading edge region and the joined trailing edge region.

6. The mechanically actuatable structural assembly of claim 1, wherein: the actuation assembly comprises a Bowden cable.

7. The mechanically actuatable structural assembly of claim 1, wherein: the actuation assembly comprises a movable slat.

8. The mechanically actuatable structural assembly of claim 1, wherein: the first and second panels are identically shaped and sized.

9. The mechanically actuatable structural assembly of claim 1, further comprising cushioning material coupled to an exterior of the first panel, coupled to an exterior of the second panel, or coupled to the exterior of the first panel and to the exterior of the second panel.

10. The mechanically actuatable structural assembly of claim 1, wherein:

the first and second panels are integrally formed as a unitary component with the first and second leading edge regions seamlessly joined together, and with the first and second trailing edge regions seamlessly joined together.

11. The mechanically actuatable structural assembly of claim 1, further comprising at least one spacer coupled between the first and second panels, and configured to facilitate movement of the movable loading element between the first and second panels.

12. The mechanically actuatable structural assembly of claim 1, further comprising an activation mechanism coupled to the actuation assembly, wherein:

the activation mechanism is controllable to pull the movable loading element from the extended state to the retracted state; and the activation mechanism is controllable to release the movable loading element from the retracted state to the extended state.

13. A seating system comprising at least one instance of a mechanically actuatable structural assembly as recited in claim 1.

14. A mechanically actuatable structural assembly comprising:

a first elastically deformable panel comprising: a first leading edge region; a first trailing edge region opposing the first leading edge region; a first side edge region; and a second side edge region opposing the first side edge region;

a second elastically deformable panel comprising: a second leading edge region rigidly coupled to the first leading edge region to form a joined leading edge; a second trailing edge region opposing the second leading edge region and rigidly coupled to the first trailing edge region to form a joined trailing edge; a third side edge region; and a fourth side edge region opposing the third side edge region, wherein the first side edge region is not directly attached to the third side edge region, and wherein the second side edge region is not directly attached to the fourth side edge region; and means for applying a compressive axial load to the joined leading and trailing edges, wherein the compressive axial load causes the first elastically deformable panel to adaptively buckle into a first loaded shape, and causes the second elastically deformable panel to adaptively buckle into a second loaded shape, and wherein removal of the compressive axial load causes the first elastically deformable panel to return to a first relaxed shape, and causes the second elastically deformable panel to return to a second relaxed shape.

15. The mechanically actuatable structural assembly of claim 14, wherein the means for applying comprises a Bowden cable that is controlled to apply the compressive axial load.

16. The mechanically actuatable structural assembly of claim 14, wherein:

application of the compressive axial load decreases distance between the joined leading edge region and the joined trailing edge region, increases distance between the first and third side edge regions, and increases distance between the second and fourth side edge regions.

17. The mechanically actuatable structural assembly of claim 14, wherein:

removal of the compressive axial load increases distance between the joined leading edge region and the joined trailing edge region, causes the first elastically deformable panel to flatten, and causes the second elastically deformable panel to flatten.

18. The mechanically actuatable structural assembly of claim 14, wherein: the first and second elastically deformable panels are identically shaped and sized.

19. The mechanically actuatable structural assembly of claim 14, further comprising cushioning material coupled to an exterior of the first elastically deformable panel, coupled to an exterior of the second elastically deformable panel, or coupled to the exterior of the first elastically deformable panel and to the exterior of the second elastically deformable panel.

20. A mechanically actuatable structural assembly comprising:

a first panel comprising: a first elastically deformable region formed from elastic material; a first leading edge region; a first trailing edge region opposing the first leading edge region; and a first pair of opposing side edge regions, wherein the first elastically deformable region resides between the first leading edge region and the first trailing edge region;

a second panel comprising: a second elastically deformable region formed from elastic material; a second leading edge region rigidly coupled to the first leading edge region to form a joined leading edge region; a second trailing edge region opposing the second leading edge region and rigidly coupled to the first trailing edge region to form a joined trailing edge region; and a second pair of opposing side regions, wherein the second elastically deformable region resides between the second leading edge region and the second trailing edge region, and wherein the second pair of opposing side edge regions are free to move relative to the first pair of opposing side edge regions;

an actuation assembly comprising: a first component configured to engage the joined leading edge region; a second component configured to engage the joined trailing edge region; a movable loading element coupled to the first component and cooperating with the second component, at least a portion of the movable loading element residing between the first and second panels;

an activation mechanism coupled to the activation device; and at least one spacer coupled between the first and second panels, wherein:

when the movable loading element is in an extended state, the first elastically deformable region is unloaded or preloaded to maintain a first relaxed shape, and the second elastically deformable region is unloaded or preloaded to maintain a second relaxed shape;

when the movable loading element is in a retracted state, the first elastically deformable region is subjected to compressive axial loading that causes the first elastically deformable region to buckle into a first loaded shape, and the second elastically deformable region is subjected to compressive axial loading that causes the second elastically deformable region to buckle into a second loaded shape;

the activation mechanism is controllable to pull the movable loading element from the extended state to the retracted state;

the activation mechanism is controllable to release the movable loading element from the retracted state to the extended state; and the at least one spacer configured to facilitate movement of the movable loading element between the first and second panels.

* * * * *